L. A. BUELL.
COMBINED LAMP AND MIRROR.
APPLICATION FILED SEPT. 22, 1909.
975,674.
Patented Nov. 15, 1910.
3 SHEETS—SHEET 1.
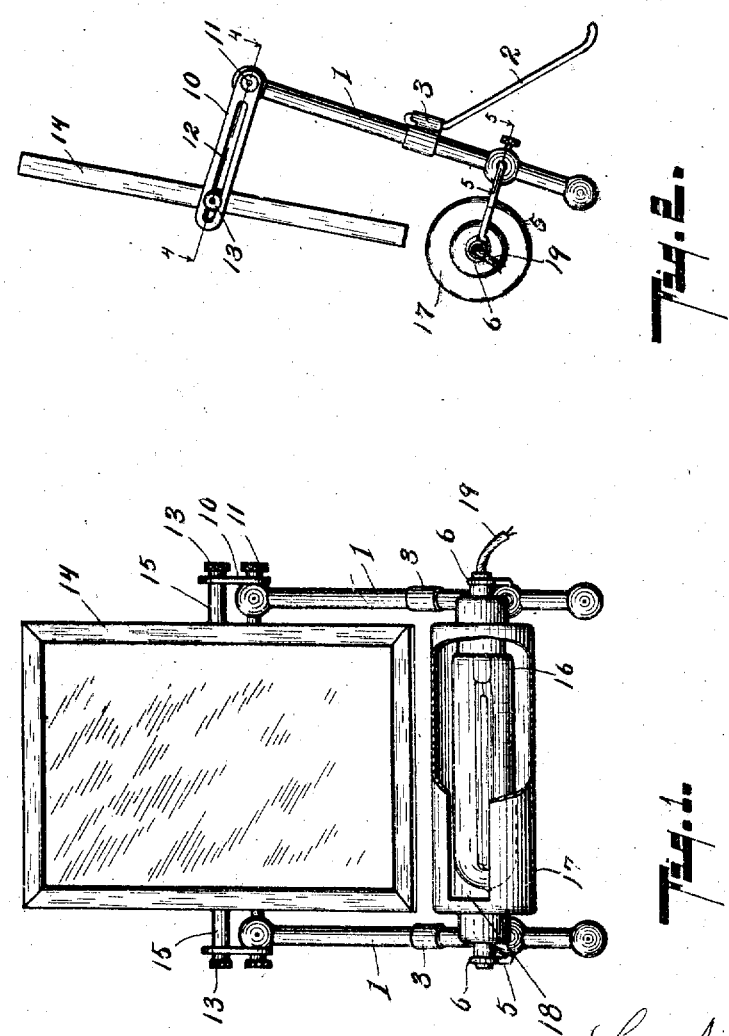

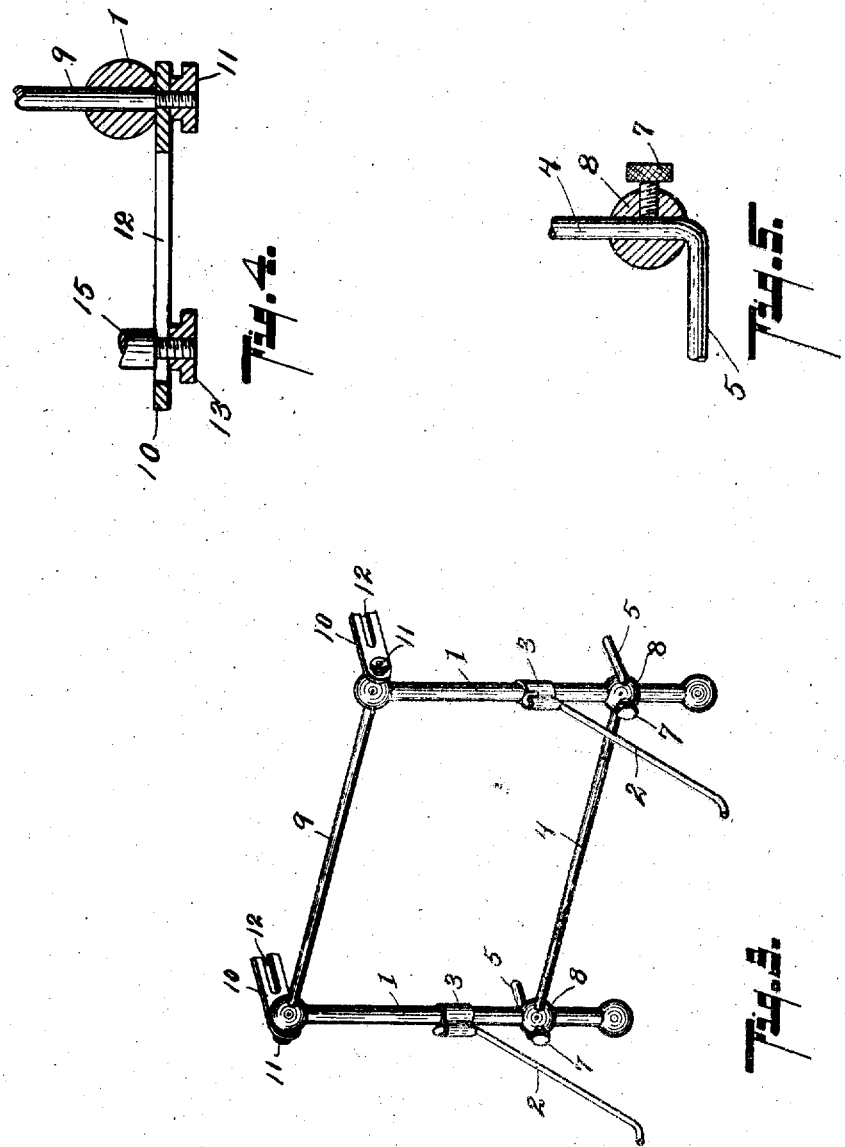

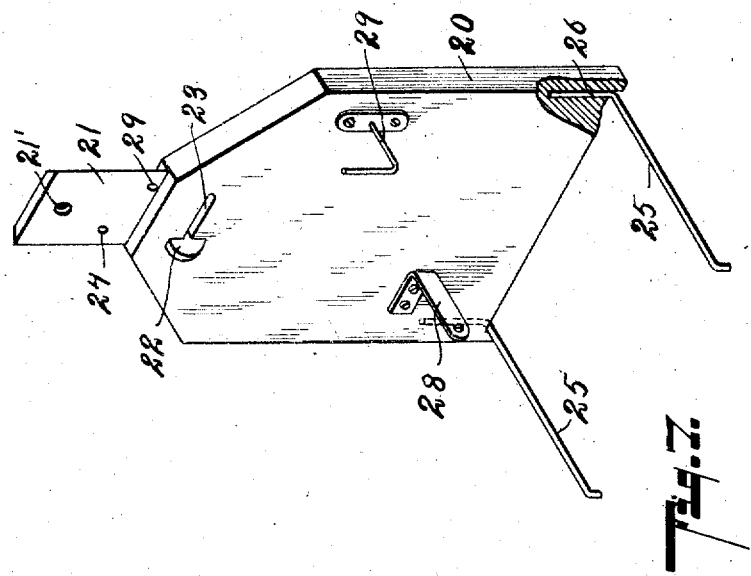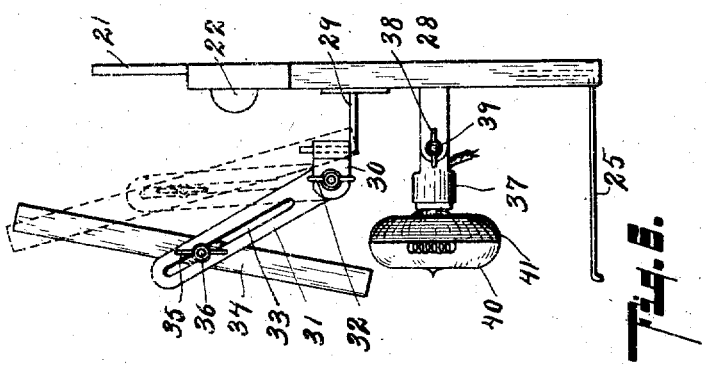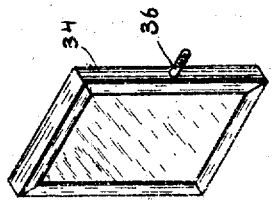

UNITED STATES PATENT OFFICE.

LEROY A. BUELL, OF KALAMAZOO, MICHIGAN.

COMBINED LAMP AND MIRROR.

975,674.  Specification of Letters Patent. Patented Nov. 15, 1910.

Application filed September 22, 1909. Serial No. 518,993.

*To all whom it may concern:*

Be it known that I, LEROY A. BUELL, a citizen of the United States, residing at Kalamazoo, county of Kalamazoo, State of Michigan, have invented certain new and useful Improvements in Combined Lamps and Mirrors, of which the following is a specification.

This invention relates to an improved combined lamp and mirror.

This invention is related to that appearing in my patent application filed April 3, 1909, and allowed August 18, 1909, Serial No. 487,684.

It relates particularly to an embodiment of the invention in which an electric lamp is made use of although the features here illustrated are also adapted to the use of an acetylene lamp.

It is a particular object of this invention to apply these various devices to an electric lamp structure.

Further objects and objects relating to structural details will definitely appear from the detailed description to follow.

I accomplish the objects of my invention by the devices and means described in the following specification. The structure described constitutes one effective embodiment of my invention. Other embodiments would be readily devised by those skilled in the art.

The invention is clearly defined and pointed out in the claims.

A structure constituting an effective and preferred embodiment of the features of my invention is clearly illustrated in the accompanying drawing, forming a part of this specification, in which:

Figure 1 is a front elevation view of my proposed combined lamp and mirror adapted to an easel support of metal. Fig. 2 is a side elevation of the structure appearing in Fig. 1. Fig. 3 is a detail view of the metal easel stand. Fig. 4 is a detail view of the adjusting means for adjusting the supporting arms for the mirror. Fig. 5 is a detail view of the adjustable support for the lamp. Fig. 6 is a side elevation view of an embodiment of the invention corresponding more closely to that appearing in my application above referred to, except that the same is adapted for use as an easel, as well as a wall plate and an incandescent lamp as shown. Fig. 7 is a perspective view of the easel structure, portions being broken away to show the details of construction and the mirror and lamp being removed. Fig. 8 is a detail perspective of the mirror of the structure appearing in Fig. 6.

In the drawings, the sectional views are taken looking in the direction of the little arrows at the ends of the section lines and similar numerals of reference refer to similar parts throughout the several views.

Considering the numbered parts of the drawings, the easel when constructed of metal has sides 1—1 terminating in suitable feet at the bottom, and with rearwardly-extending supporting arms 2 and 2 which are preferably pivoted by suitable clips 3 to the said sides, so that they can be collapsed onto the back of the easel. These sides 1—1 are connected by a cross arm 4 which is adjustable in suitable holes through the sides by set screws 7. The said cross bar extends into forwardly-projecting arms 5—5 which are turned into loops 6 which embrace the ends of an incandescent electric lamp structure, so that the lamp is pivotally supported in said arms and the height of the said lamp is adjustable by adjusting the said arms 5 by means of the said screws 7. The cross arm 4 extends through suitable ball enlargements which embrace the standards 1.

On the upper end of the standards 1 are supported adjustable arms 10, by means of set screws 11, around which said arms pivot. The arms 10 contain longitudinal slots 12, in which are inserted set screws 13, which extend into laterally-projecting arms 15 on each side of the mirror 14, whereby the angle and position of the mirror 14 can be adjusted by means of said set screws 13 in said slots 12. The arms themselves are adjustable, as before indicated, which makes the mirror completely adjustable so that it can be swung in front of or to the rear of the incandescent electric lamp which is preferably arranged below the mirror.

The incandescent electric lamp 16 is supported in a suitable reflecting casing 17, which is slotted at 18, to direct the light, the bulb being preferably of the elongated kind, as indicated in Figs. 1 and 2. The electric wiring 19 leads into the socket, which socket is supported and which lamp and reflector are supported by the loops 6 on the forward ends of the arms 5 already described. From this, it will be seen that the lamp can be swung down into close contact with the back of the easel, made up of the standards 1—1 and the mirror can be effectively collapsed, and the supports 2—2 can be folded making a very compact structure, which can be conveniently transported in a traveling bag or suit-case in the event that it is desired to use the device when traveling. This is of advantage for packing and shipping.

It will be seen that light can be projected from this apparatus onto the face of the user, and the eyes of the user can be protected by the mirror being projected over the light, or the reflector 17 can effectively direct the light onto the face of the user, so that the face of the user, particularly the lower part, in shaving, can be properly illuminated and in that way the eyes are protected and the illuminated part can be effectively seen when reflected from the mirror 14.

What I have here described is the preferred construction, and it will be observed, by reference to Figs. 6, 7 and 8, that the structure described in my former application is equally well adapted to the electric illumination. Here the wall plate 20 is provided with pivoted wall supports 25—25, which preferably swing to the front, in view of the fact that the wall plate is adapted to be suspended by the adjustable bar 21 at the back. This adjustable bar is adjusted by means of the pin 22, in the slot 23, which enters a series of perforations 24—24, as illustrated. The suspending bar 24 is provided with an aperture 21' at the top for hanging the same.

On the front of the wall plate 20 is a forwardly-projecting bracket 28, to which the electric lamp socket is pivoted. There is also a forwardly-projecting mirror bracket 29 on which a clip 30 is suitably pivoted and adjusted by means of the set screw 32. The set screw 32 also serves as the pivotal support for the arm 31, which carries the mirror. This arm 31 is provided with a longitudinal slot 33, in which the pin 36 on the mirror 34 is fitted and which is the screw on which the thumb-nut is placed to clamp the arm 31 and hold the mirror adjustably in position.

The adjustment of the mirror back of the lamp is indicated by the dotted lines in Fig.
6. The incandescent lamp is supported on the bracket 28. It is of the type of lamp which is made use of in magic lanterns, and the modern device called the "projectoscope" for projecting post-cards, being of substantially flattened form with a reflector 41 at the back, formed by a coating on the bulb itself. The socket 37 is pivoted to the bracket 28 by the screw 38, as already in- dicated. The electric wiring is indicated at 39.

I have shown my preferred embodiments. Others will suggest themselves to those skilled in the art.

Having thus described my invention, what I claim as new and desire to secure by Letters Patent is:—

1. In a combined lamp and mirror, a suitable support; a lamp provided with a reflector arranged to illuminate the user by the direct rays of said lamp; and a mirror arranged to project partially in front of said reflector to screen the eyes of the user from the direct rays of the lamp, while illuminating the part to be reflected, as specified.

2. The combination with a support having an adjustable hanger, of a lamp with a reflector mounted on said support, arranged to illuminate the user by the direct rays of said lamp; and a mirror mounted on said support to be vertically adjusted and tilted in front of said reflector to screen the eyes of the user while illuminating the part to be reflected, for the purpose specified.

3. The combination with a support, of a lamp with a reflector mounted on said support arranged to illuminate the user by the direct rays of said lamp; and a mirror mounted on said support to be vertically adjusted and tilted in front of said reflector, for the purpose specified.

4. A combined lamp and mirror comprising a support; a mirror adjustably mounted on said support; a lamp adjustably mounted on said support so arranged as to cast its rays of light directly upon the person of the user; and means to protect the eyes of the user from said direct light rays.

5. A combined lamp and mirror comprising a support; a mirror adjustably mounted on said support; a lamp mounted on said support back of and projecting below said mirror, said mirror intercepting the forwardly directed rays from the upper portion of said lamp, to protect the eyes of the user.

6. A combined lamp and mirror consisting of the combination of a support; an adjustable mirror on said support; a lamp on said support disposed beneath said mirror and arranged to cast its rays of light directly upon the face of the user; and adjustable means disposed to cover the upper portion of said light to screen the eyes of the user from said direct light rays.

In witness whereof, I have hereunto set my hand and seal in the presence of two witnesses.

LEROY A. BUELL. [L. S.]

Witnesses:
F. GERTRUDE TALLMAN,
CLORA E. BRADEN.